Feb. 28, 1950           H. A. SMITH           2,499,284
AIRPLANE STALL INDICATOR
Filed April 29, 1947           2 Sheets-Sheet 1
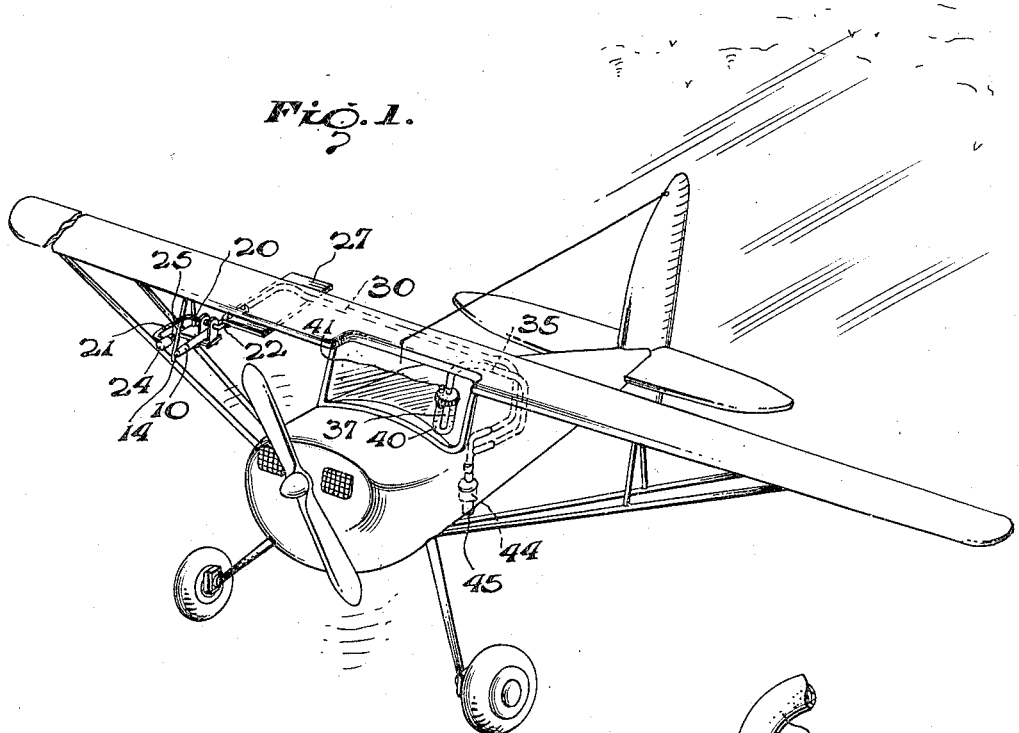
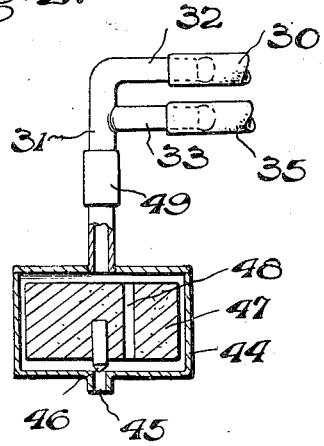
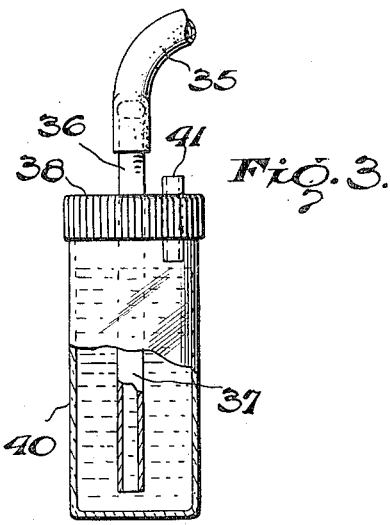
Inventor
Hubert A. Smith
By Herbert M. Birch
Attorney Feb. 28, 1950 H. A. SMITH 2,499,284
AIRPLANE STALL INDICATOR
Filed April 29, 1947 2 Sheets-Sheet 2

Inventor
Hubert A. Smith

By Herbert M. Birch

Patented Feb. 28, 1950

2,499,284

UNITED STATES PATENT OFFICE 2,499,284

AIRPLANE STALL INDICATOR

Hubert A. Smith, Bay Pines, Fla.

Application April 29, 1947, Serial No. 744,554

11 Claims. (Cl. 116—117)

The present invention relates to airplane stall indicators.

It is known that any specified airplane wing will stall at a specific angle of attack and this stall condition develops at different ranges with different types of planes. When a stall condition develops the aircraft will fall, go into a nose dive or spin, unless the pilot is promptly notified of the condition so he can increase the lift by proper manipulation of the necessary controls.

Heretofore there have been numerous types of stall indicators developed to warn the pilot of a stall condition, but these prior devices are not safe as they give an indication only when a stall condition occurs. For example, should the apparatus be out of order, it will fail to function when stall occurs with the result that the pilot thinking the system is in good operating order is depending on a warning signal which is never given even though the plane approaches and actually reaches a stalled condition.

Many accidents have occurred because of the failure of such indicators, which have been thought to be in working order.

With the present invention, however, this indicator is giving a constant signal as long as the same is in working order. That is, never ceases to function during safe flying conditions, until stall develops. Also, if because of some mechanical defect the indicator fails to function before a stall condition exists, the pilot is put on notice at once that the system is out of order and can take the necessary steps to repair the system at once.

Accordingly, an object of the present invention is to provide an airplane stall indicator adapted to constantly function to give a signal as long as flying conditions are safe, but which will cease to function when an unsafe or stall condition develops.

Another object is to provide in an indicator, means operable from the pressure developed by forward motion of the aircraft which operates until the angle of attack shifts to the stall angle of the aircraft, whereupon the pressures developed during flight are cut-off to the indicator and the indicator ceases to function.

Another object is to provide a novel stall warning system controlled solely by the angle of attack of the aircraft and activated by the air stream, whereby the warning will always be correct regardless of variations of load or speed conditions, whether the load condition is caused by actual weight or by centrifugal force, such as may develop in changing the direction of flight.

A further object is to provide stall indicator apparatus, which is very light in weight, durable and economical to manufacture.

Still another object is to provide a stall indicator having a transparent liquid holding container for forming air bubbles adapted to be positioned in direct line with a pilot's normal vision on or adjacent the windshield of the airplane, for example, so the pilot cannot fail to continuously see the normally bubbling indicator.

The above and other objects and advantages of the invention will appear more fully hereinafter from a consideration of the detailed description which follows, taken together with the accompanying drawing wherein only one embodiment of the invention is illustrated. It is to be understood, however, that the drawings are for the purpose of illustration only and are not intended to define the limits of the invention, reference being had for that purpose to the appended claims.

In the drawings wherein like reference characters refer to like parts throughout the several views:

Figure 1 is a perspective view of an airplane with the novel stall warning system illustrated and shown attached to the airplane.

Figure 2 is a cross section view of a moisture collecting chamber and discharge arrangement for the accumulated moisture.

Figure 3 is a view partly in elevation and partly in cross section illustrating a preferred form of transparent indicator for receiving the air flow developed from the forward motion of the aircraft from the air pick-up tube mounted on the aircraft as shown in Fig. 1.

Figure 4:
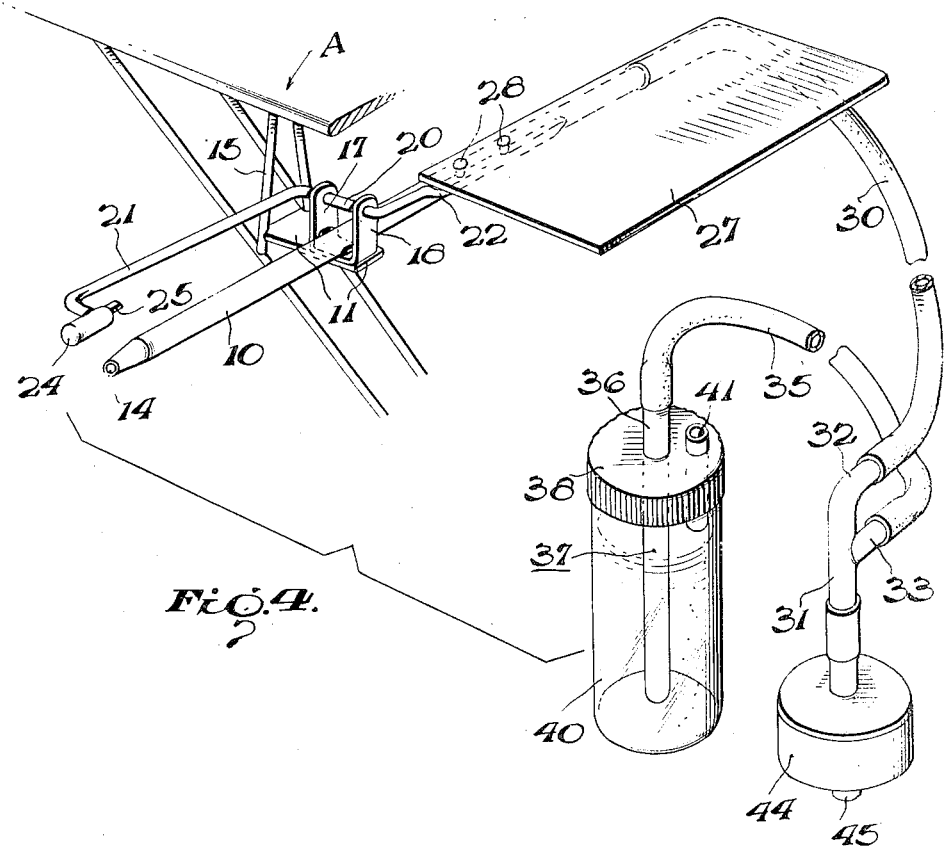
Figure 4 is an enlarged perspective view of the several elements connected together for operation showing only a portion of an aircraft wing and strut structure for mounting the air pick-up tube.

Referring in detail to the drawings and first with particular reference to the enlarged assembled view in Figure 4, the system comprises an air pick-up tube 10 rigidly mounted by means of a bracket 11 on the outside of an airplane A. This tube 10 is formed with a tapered open nose or orifice 14 extending to the front of the airplane directed into the air stream, but at a suitable location where the air stream is not affected by the slip stream from the propeller. For example as shown, the bracket 11 is secured to one of the airplane's wing struts 15.

The bracket 11 is formed with a pair of spaced apart upright apertured lugs 17 and 18 aligned toward the fuselage of the airplane. Pivotally mounted in the lugs is a shaft 20 having integrally formed therewith arms 21 and 22 extending fore and aft of the airplane, respectively. The arm 21 extends forward from the lugs 17 to the end of the air pick-up tube 10 and is formed with a weighted orifice shield or head 24 and a rear stop lug 25 engageable with the tapered end of the tube 10 when stall occurs while the arm 22 extends aft from the opposite lug 18 a distance substantially equal to the arm 21 and has secured thereto a plate 27 of an equal weight to the orifice shielding head 24. The plate 27 may be secured to the arm 22 by any suitable means such as rivets 28.

The head 24 is cylindrical and may be a hollow body filled with lead or solid to balance the weight of plate 27, which plate is responsive to the air stream developed as the airplane moves forward through the ambient atmosphere.

As the shaft 20, arms 21, 22 and the head 24 and plate 27 are all rigidly connected, a pivotal movement of the plate 27 imparts movement to the shaft 20 and the head 24, for the exposing of the orifice to the flow of air stream as hereinafter to be explained in more detail under the heading "Operation."

The tube 10 is a relatively short section with respect to the associated structure of the airplane and at its trailing end is connected to an elongated section of flexible tubing 30. The tubing 30 leads to a rigid connection 31 formed with upper and lower inlet nipples 32 and 33. The inlet 32 coupling with the outlet end of the flexible tube 30 and the lower nipple 33 coupling to one end of another section of flexible tubing 35. The opposite end of the flexible tube 35 couples to an extension 36 of a rigid tube 37 mounted in the cover 38 of a transparent container 40.

This transparent chamber or container 40 is filled or partially filled with a non-freezing, non-evaporating liquid of any desired type, and the tube 37 extends through the cover 38 into the chamber just short of the bottom thereof, so that air originating from the pick-up tube 10 will bubble upward from the bottom of the container and out through a vent tube 41, also mounted in the cover 38.

From the lower air by-pass nipple 33 the connection 31 opens into a rain or moisture collecting chamber 44. The chamber 44 is preferably mounted inside the structure of the airplane, see Figure 1, at a lower level than the transparent indicating container 40. This chamber 44, as shown in Figure 2, is formed with an outlet opening 45 normally closed by a valve 46 actuated by a float 47 when sufficient water has accumulated therein to raise the float. To facilitate the action of the float 47 there is formed a water passage 48 through the same opening toward the bottom of the chamber 44. Also, to provide for removal and clearing of the float 47 and chamber 44 there is provided a detachable coupling 49 of any suitable type.

*Operation*

Figure 5:
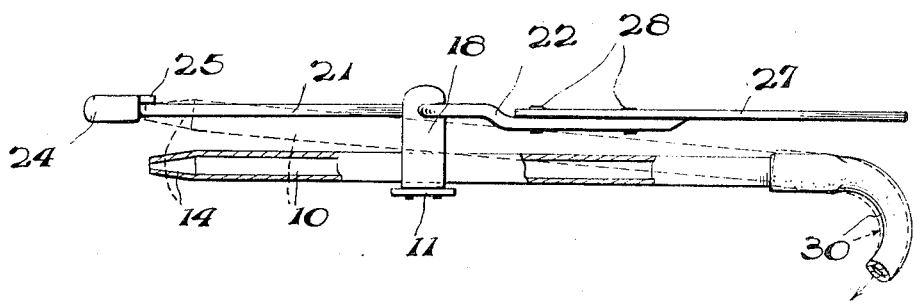
Figure 5 is a side elevational view of the air pick-up tube and control plate and valve pivoted thereon, shown in dotted and full line positions of operation.

The operation of the system is easily understood by reference first to Figure 5, which shows by the full line the indicator controlling position of the members 24 and 27 for forming bubbles in the indicator container 40 when the airplane is in normal flight and by the dotted line, the indicator controlling position for stopping the bubbles when the airplane is stalled.

For example, when the airplane is in normal flight at a normal angle of attack, the plate 27 is maintained substantially parallel with the air stream which air stream is in turn always substantially parallel to the airplane thrust line or direction of flight and the orifice 14 of the air pick-up tube 10 is exposed, the head 24 being held up and out of line therewith. Thus to understand the operation it should be kept in mind that the air stream and the direction of flight or thrust line of the airplane always being parallel never change their angular relation with respect to each other. It is the airplane and its wing structure that changes with respect to the air stream during flight and the pickup tube 10 fixed to the wing struts 15.

While the orifice 14 is thus open, air flows through the tube 10, flexible tube 30, to connection 31, out of nipple 32, through flexible tube 35 and into the fluid holding transparent container 40 by way of tube 37. As the air flows out of the end of tube 37 it rises up through the liquid and out of the vent tube 41. This rising action of the air makes continuous bubbles within the liquid as long as the air continues to circulate, however, when the airplane A and the rigidly mounted air pick-up tube 10 assume an angle to the air stream (angle of attack), the orifice end of the tube 10 will move upward in line with the head 24 and shield the orifice 14 and the air flow is arrested through the tube circuits into the container 40. Instantly that this occurs the bubbles will cease and the pilot will at once be notified of an approaching stall condition. Preferably the indicator container 40 is mounted on the windshield of the airplane in the direct line of vision of the pilot, as by suction cups or brackets from the windshield frame.

The moisture drain chamber 44 as stated is below the level of the rest of the system and the indicator container 40, so that any moisture from rain, condensation or the like will run down connection 31 into the chamber 44. When sufficient water accumulates to raise the float it will drain off through outlet 45.

Thus I have provided a novel stall warning system for airplanes, which gives a constant visual signal to the pilot during normal or safe flight conditions, so the pilot is constantly assured that the device is in good repair. Also, I have provided a stall indicator solely responsive to angle of attack independently of air speed, lift, etc., and which is light in weight with a transparent part so as to be mountable on the windshield of the craft in line with the pilot's normal line of vision.

Without further description it is thought that the advantages of the present novel stall warning system over the prior art will be apparent and while only one embodiment is illustrated, it is to be expressly understood the same is not limited thereto, as various changes may be made in the design and arrangement of the parts illustrated, as will now appear to those skilled in the art. For a definition of the scope or limits of the invention, reference should be had to the appended claims.

What I claim is:

1. Means for indicating stalling of an aircraft, comprising an air tube open toward the direction of motion of the aircraft, a transparent chamber containing liquid mounted on the aircraft, a conduit connecting said transparent liquid containing chamber with the air tube, said air in the tube forming indicating bubbles in the chamber during safe flight conditions, a plate pivotally mounted adjacent said tube responsive to the flow of air developed from the motion of the aircraft and a member connected to said plate and equal in weight thereto adapted to shield the open end of said tube when the angle of attack of the aircraft approaches stalling to stop the formation of said bubbles in the chamber.

2. An airplane stall indicator comprising a transparent liquid chamber mounted on an aircraft in the line of vision of a pilot, a tube mounted on the aircraft opening in the direction of motion, means responsive to the air stream developed by the forward motion of the craft pivotally mounted on the aircraft in a plane above the tube, a member carried by said means adapted to position in front of the opening in said tube when the angle of attack approaches the stall angle, and a conduit connected to said tube and to said transparent liquid chamber adapted to supply a constant flow of air through the liquid in the chamber so as to form bubbles therein, to an air outlet from said chamber to the atmosphere, until the angle of attack approaches the stall angle and said member positions in front of the tube, to thereby stop the flow of air through the liquid.

3. A stall warning system comprising an air pick-up tube rigidly mounted on the structure of an aircraft with its orifice opening in the direction of the air stream set up by the forward motion of the aircraft, means pivotally mounted on the aircraft in a plane above the tube responsive to the air stream and adapted to be maintained substantially parallel to the same independently of the aircraft's angle of attack, and a transparent container holding liquid connected to the outlet end of said tube adapted to continuously display bubbles while the aircraft is in normal flight, the position of said tube changing with the angle of attack of the aircraft, whereby when the stalling angle is reached said means is adapted to shield said tube orifice and stop the formation of bubbles in said container to warn the pilot of the stall condition.

4. A stall warning system comprising an air pick-up tube rigidly mounted on the structure of an aircraft with its orifice opening in the direction of the air stream set up by the forward motion of the aircraft, a shaft pivotally mounted on said structure of the aircraft in a plane above the tube having arms extending fore and aft of the tube, one of said arms carrying a shield member for the orifice end of said tube and the other carrying a plate responsive to the flow of the air stream, to thereby normally retain said shield member away from the orifice end of the tube, and indicator means connected to said tube and responsive to the flow of air passing through the tube until the angle of attack changes sufficiently to align the end of said tube with said shield member.

5. An airplane stall indicator comprising air pick-up means mounted on the airplane structure fore and aft of the same in the air stream outside the slip stream of the propeller movable according to the airplane's angle of attack, means pivotally associated with said air pick-up means adapted to maintain a position parallel with the air stream developed by the forward motion of the airplane, said second-named means including a shield member for closing off the flow of air in said air pick-up means, and a liquid chamber connected to said air pick-up means in which bubbles are continuously developed by air flow thereto from said air pick-up means until the angle of attack changes sufficiently to align the end of said air pick-up means with said shield member.

6. An airplane stall indicator comprising air pick-up means mounted on the airplane structure fore and aft of the same in the air stream outside the slip stream of the propeller movable according to the airplane's angle of attack, means pivotally associated with said air pick-up means adapted to maintain a position parallel with the air stream developed by the forward motion of the airplane, said second-named means including a shield member for closing off the flow of air in said air pick-up means, a liquid chamber connected to said air pick-up means in which bubbles are continuously developed by air flow thereto from said air pick-up means until the angle of attack changes sufficiently to align the end of said air pick-up means with said shield member, a moisture collecting chamber, conduits connecting the same with the air pick-up means, and a valve regulated moisture discharge outlet in said chamber.

7. An airplane stall indicator controlled solely by the angle of attack of the airplane comprising air pick-up means movable solely according to angle of attack of the airplane wing, freely pivoted means operatively associated with said first means responsive solely to the air stream during flight independently of angle of attack adapted to render said air pick-up means inoperative when the angle of attack is at stall, and a liquid holding indicator container connected to the air pick-up means adapted to display bubbles until the said first means is cut off by said second-named means.

8. A continuously operating airplane stall indicator during normal flight comprising air pick-up means movable according to angle of attack, second means fixed to the airplane so as to be operatively associated with said first means constantly maintained substantially in a plane parallel to the flow of the air stream developed during flight independently of angle of attack, said second means serving to render said air pick-up means inoperative when the angle of attack of the airplane is at stall, and an indicator connected to said pick-up means responsive to operation of said air pick-up means for warning of a stall condition when said air pick-up means is made inoperative to pick up air by said second means.

9. An airplane stall indicator comprising an air pick-up tube opening in the direction of flight of an airplane on which it is fixedly mounted, said tube being movable solely by the airplane as the angle of attack of the airplane changes, cut-off means operatively associated with said pick-up tube responsive solely to the resultant forces of the air stream developed during flight said air stream being parallel to the direction of flight, the opening in said pick-up tube being closed by said cut-off means only when the angle of attack of the airplane to which the said tube is fixed is at stall, an indicator for giving a constant signal during flight until the angle of attack of the airplane supporting said tube is at stall, and an elongated section of tubing connecting said pick-up tube with said indicator.

10. A stall warning indicator for use on an airplane in flight comprising a conduit means having one end terminating at the leading edge of an airplane wing and the other end of said conduit terminating in an air-flow operated signal means, a valve adjacent said conduit at the leading end thereof, to control the air movement therethrough, the position of said valve being responsive solely to the position of a control vane responsive solely to the resultant forces of the air stream flowing about said wing during flight, said air stream being parallel with respect to the direction of flight of the airplane, whereby the flow of air through said conduit and the operation of said signal means is controlled.

11. A stall warning indicator for use on an airplane in flight comprising a conduit means having one end opening toward the front of the airplane, said conduit being spaced from the airplane wing in the air stream developed during flight and the other end of said conduit terminating in an air-flow operated signal means, a freely pivoted valve mounted adjacent said conduit at the leading end thereof, to control the air movement therethrough, the position of said valve being responsive solely to the position of a control vane responsive solely to the resultant forces of the air stream flowing around said conduit during flight, said air stream being parallel with respect to the thrust line and direction of flight of the airplane, whereby the flow of air through said conduit and the operation of said signal means is controlled.

HUBERT A. SMITH.

REFERENCES CITED

The following references are of record in the file of this patent:

UNITED STATES PATENTS

| Number | Name | Date |
| --- | --- | --- |
| 2,287,497 | Rockefeller | June 23, 1942 |
| 2,478,967 | Greene | Aug. 16, 1949 |